(12) United States Patent
Smith et al.

(10) Patent No.: US 12,524,321 B2
(45) Date of Patent: Jan. 13, 2026

(54) BUS AUTODETECT

(71) Applicant: Tektronix, Inc., Beaverton, OR (US)

(72) Inventors: Mark Anderson Smith, Portland, OR (US); Byron T. Faber, Beaverton, OR (US); Rohan Dhesikan, Flower Mound, TX (US); Kimberly Horton, Salem, OR (US); Yurim Lee, Portland, OR (US); Kathleen Elisabeth Smith, Gresham, OR (US)

(73) Assignee: Tektronix, Inc., Beaverton, OR (US)

( * ) Notice: Subject to any disclaimer, the term of this patent is extended or adjusted under 35 U.S.C. 154(b) by 1092 days.

(21) Appl. No.: 17/039,691

(22) Filed: Sep. 30, 2020

(65) Prior Publication Data

US 2021/0096971 A1 Apr. 1, 2021

Related U.S. Application Data

(60) Provisional application No. 62/909,150, filed on Oct. 1, 2019.

(51) Int. Cl.
*G06F 11/26* (2006.01)
*G06F 11/22* (2006.01)
*G06F 13/20* (2006.01)
*G06N 20/00* (2019.01)

(52) U.S. Cl.
CPC ............ *G06F 11/26* (2013.01); *G06F 11/221* (2013.01); *G06F 13/20* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,431,561 | B2* | 8/2022 | Smith | G06F 16/1824 |
| 11,776,276 | B1* | 10/2023 | Muron | G06V 20/54 |
| | | | | 382/100 |
| 2016/0224489 | A1* | 8/2016 | Mishra | G06F 13/364 |

(Continued)

OTHER PUBLICATIONS

Yokogawa Electric Corporation, "Serial Bus Analysis Application Note," retrieved from https://cdn.tmi.yokogawa.com/DLM2000_Serial_Bus_Analysis_App_Note.pdf, last accessed Jan. 15, 2021, 10 pages.

(Continued)

*Primary Examiner* — Henry Tsai
*Assistant Examiner* — Christopher A Bartels
(74) *Attorney, Agent, or Firm* — Miller Nash LLP; Andrew J. Harrington; Krista Y. Chan (57) ABSTRACT

A test and measurement instrument includes a processor configured to execute instructions that cause the processor to: receive a bus auto-detect signal; receive signals from a bus connected to the test and measurement instrument; and apply machine learning to the signals from the bus to output a predicted a bus type; at least one memory to store the instructions and data used in the machine learning, and a display to display information for a user including the predicted bus type. A method of automatically detecting a bus type includes receiving a bus auto-detect signal when a bus is connected to a test and measurement instrument, receiving signals from the bus at a processor, and using the processor to apply machine learning to the signals from the bus to predict a bus identity.

20 Claims, 4 Drawing Sheets

(56) References Cited

U.S. PATENT DOCUMENTS

| | | | | |
|---|---|---|---|---|
| 2016/0299855 A1* | 10/2016 | Pitigoi-Aron | | G06F 13/4295 |
| 2017/0235848 A1* | 8/2017 | Van Dusen | | G06Q 30/0201 |
| | | | | 705/12 |
| 2018/0211380 A1* | 7/2018 | Tandon | | G06V 20/69 |
| 2019/0033845 A1* | 1/2019 | Cella | | H03M 1/12 |
| 2019/0235890 A1* | 8/2019 | Schnoor | | G06F 13/4068 |
| 2019/0379683 A1* | 12/2019 | Overby | | H04W 4/48 |
| 2019/0384303 A1* | 12/2019 | Muller | | G06N 20/00 |
| 2020/0209282 A1* | 7/2020 | Absher | | G06N 20/00 |
| 2020/0215695 A1* | 7/2020 | Cristache | | G06N 5/025 |
| 2020/0293064 A1* | 9/2020 | Wu | | G06N 3/045 |
| 2020/0298401 A1* | 9/2020 | Cristache | | B25J 9/163 |
| 2020/0342350 A1* | 10/2020 | Madar, III | | G06F 12/1036 |
| 2021/0010954 A1* | 1/2021 | Adler | | H05K 1/115 |
| 2021/0073661 A1* | 3/2021 | Matlick | | H04L 61/3025 |
| 2021/0089946 A1* | 3/2021 | Pegors | | G06N 5/04 |
| 2021/0090694 A1* | 3/2021 | Colley | | G16B 30/00 |
| 2021/0118559 A1* | 4/2021 | Lefkofsky | | G16B 20/00 |
| 2021/0194724 A1* | 6/2021 | Lee | | H04J 14/0283 |
| 2021/0374384 A1* | 12/2021 | Munkberg | | G06N 3/045 |
| 2021/0397577 A1* | 12/2021 | Kahn | | H04L 67/1097 |
| 2022/0215948 A1* | 7/2022 | Bardot | | G16H 40/40 |
| 2022/0399112 A1* | 12/2022 | Bardot | | G16H 40/40 |
| 2023/0089205 A1* | 3/2023 | Cella | | G05B 19/41875 |
| | | | | 702/188 |
| 2023/0112401 A1* | 4/2023 | Cristache | | B25J 5/007 |
| | | | | 701/22 |
| 2023/0211493 A1* | 7/2023 | Cristache | | G06N 5/022 |
| 2023/0281527 A1* | 9/2023 | Cella | | G06N 3/088 |
| | | | | 705/7.17 |

OTHER PUBLICATIONS

Agilent Technologies, "I2C and SPI Protocol Triggering and Decode for Infiniium 9000 Series Oscilloscopes Data sheet," retrieved from https://assets.testequity.com/te1/Documents/pdf/I2C-SPI-9000.pdf, 2009-10-01, last accessed Jan. 15, 2021, 8 pages, Agilent Technologies, Inc., USA.

* cited by examiner

BUS AUTODETECT

RELATED APPLICATIONS

This application is a continuation of, and claims priority to, U.S. Provisional Patent Application No. 62/909,150, filed Oct. 1, 2019.

FIELD

This disclosure relates test and measurement instruments, more particularly to test and measurement instruments that automatically detect the type of bus when the bus is connected to the instrument.

BACKGROUND

Users who analyze a device under test (DUT) will typically connect the device to an oscilloscope or other test and measurement instrument with a probe. Devices under test may include buses, for example a digital bus including a plurality of related digital signals. However, inexperienced users may not know the bus type, and therefore may have difficulty setting up the instrument to properly measure or analyze the bus. To be able to detect the bus type automatically would have several uses in a variety of situations, including schools, shops, government labs, and companies with new engineers.

In addition, the ability to detect a bus automatically would save engineers time if they frequently need to add and remove buses. Further, different customers, and even different users within a common customer, may use different probes and tools. Current oscilloscopes do not have the ability to adjust to different probes, nuanced probes, or tools. Some customers cannot acquire a custom solution for them, as it may require disclosure of information that cannot be disclosed.

Embodiments of the disclosed apparatus and methods address shortcomings in the prior art.

DETAILED DESCRIPTION

Embodiments of the disclosed technology generally allow test and measurement instruments, such as oscilloscopes, to detect the bus type automatically of any signal connected to the scope, such as plugged into an instrument channel. Some embodiments may identify up to twenty-five different signals, including clock and data signals. Some embodiments have achieved greater than approximately 78% accuracy in the automatic identification of a connected bus type. Embodiments may generally include automatic detection and setting of bus type of a live signal, auto detection of channel input types, and the ability to adapt to the signals used by customers based on usage patterns. The embodiments provide an improvement over existing solutions that only apply supervised machine learning. This avoids having to label large data sets to build a supervised learning model.

Other solutions have attempted to solve these problems. One approach involves detecting one of a small set of known bus type, and does not work on all of the bus types depending upon the product being used. Some current approaches allow for automatically setting features of bus signals, such as sample rate, etc., but do not detect the bus type.

An objective of embodiments of the disclosed technology is to optimize the process of adding a new bus for engineers of all backgrounds and for tools of all types. The ability to detect bus types automatically will dramatically decrease the learning curve for newer engineers or technicians with little formal training and save a significant amount of time for engineers who need to frequently add and remove buses. The ability to adapt to probe data from users will allow the feature to adjust to the specific probes the customer uses.

For ease of understanding, the discussion here will use the example of an oscilloscope. However, embodiments can use multiple types of test and measurement instruments. Some areas of application may include schools, shops with nuanced tools, companies employing technicians, and the US and/or foreign governments. Schools or companies teaching budding engineers would benefit from having a greatly simplified process for introducing students to using oscilloscopes and instruments. Places with nuanced probes, equipment, or proprietary buses they cannot disclose will benefit from customized bus analysis.

Figure 1:
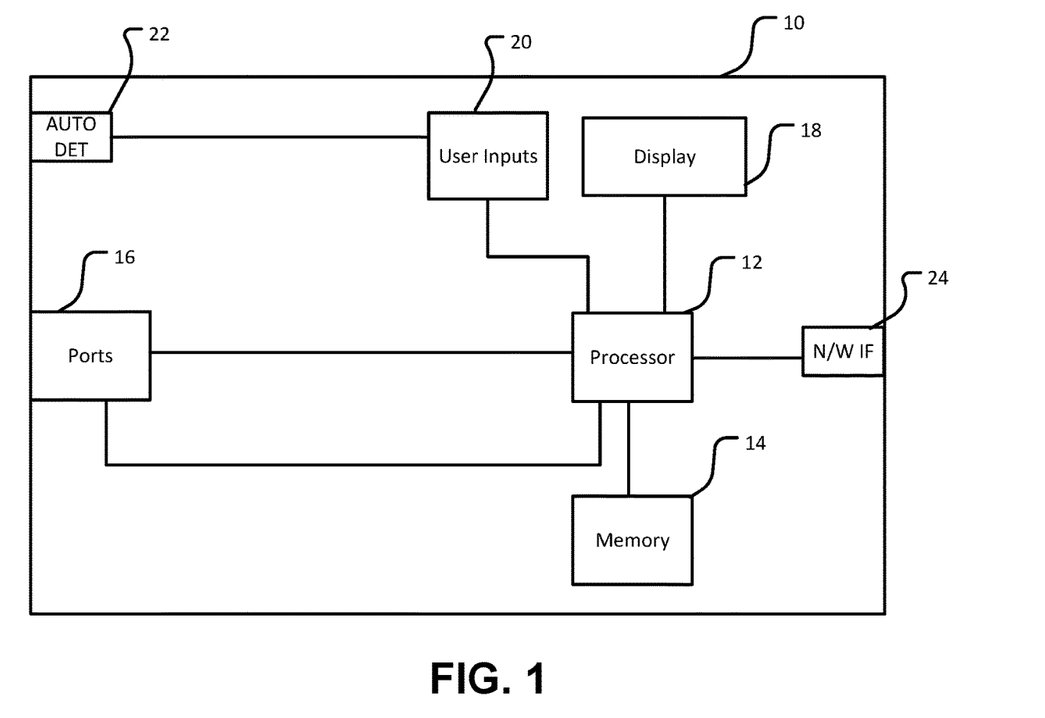
FIG. 1 shows an embodiment of a test and measurement device capable of automatically detecting a bus type.

FIG. 1 shows a test and measurement instrument, such as an oscilloscope. In this embodiment, the instrument 10 has an auto-detect input, such as a button, 22 as part of its user inputs 20. The button may also be an explicit 'bus auto-detect' input on a user interface. The instrument may not have an auto-detect input but may perform automatic detection of a bus type upon sensing the connection of a bus to the instrument, or may have an auto-detect button and over time develops the ability to detect the connection of a bus without an explicit input. Alternatively, the user could add the bus through a user interface that would create the auto-detect input. For example, some oscilloscope user interfaces include an "Add Bus" button to enable analysis and display of the connected bus signals. Typically, these oscilloscopes then require additional configuration, such as entry of bus settings or parameters, to properly display the bus.

In either case, a bus connects to the instrument 10 through one or more of the ports 16. Upon connection, and either by detection, the user adding the bus through a user interface, or by the user pressing an auto-detect button, a bus auto-detect input is received as a bus auto-detect signal at the processor 12. The processor then receives signals from the connected bus and applies machine learning to predict the bus type automatically.

The instrument will typically include at least one memory 14 that contains instructions to be executed by the processor, and may contain a dataset used to train the machine learning models discussed below. In addition, the memory may store data received from devices under test, including busses and other devices. Memory 14 may comprise multiple memories, or the dataset, test data, etc., may be stored remotely and accessed across a network through network interface 24.

The instrument will also typically include a display 18. As will be discussed in more detail later, the display may provide a detected bus type to the user, or allow the user to alter the bus type.

Figure 2:
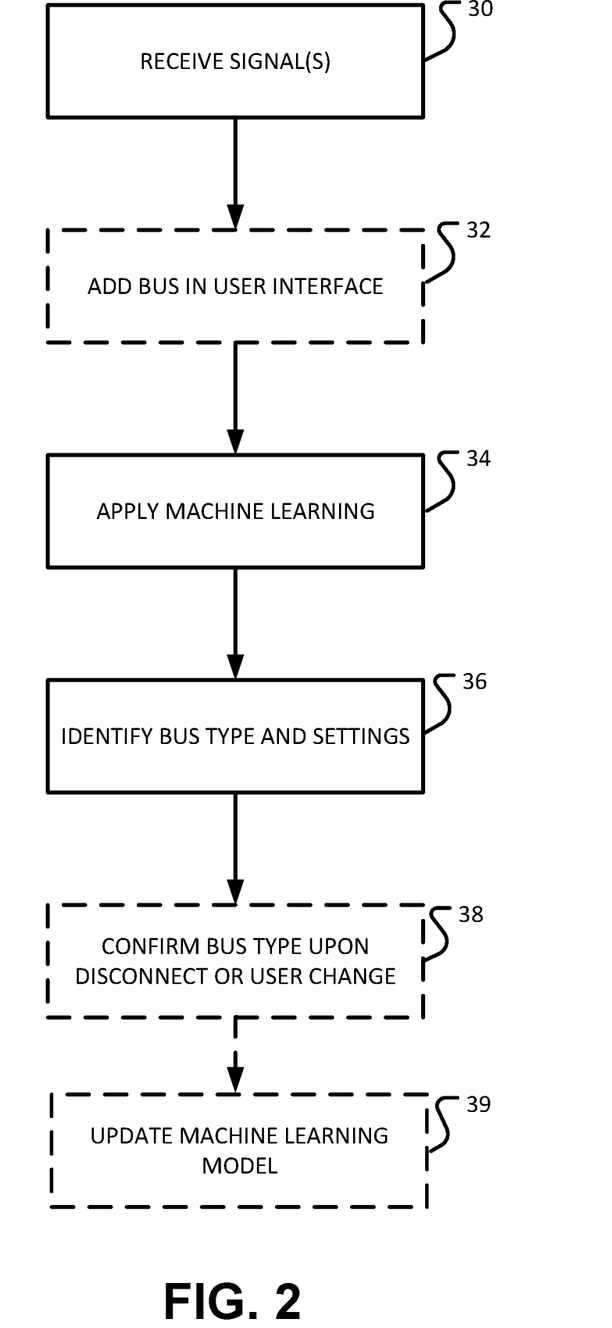
FIG. 2 shows a flowchart of an embodiment of an automatic method to detect a bus type.

FIG. 2 shows a flowchart of one embodiment of a method of automatically detecting a bus type of a bus connected to a test and measurement instrument, such as the instrument 10 of FIG. 1. The system receives a signal or signals at 30, in response to detection of the bus connection by the instrument, the pressing of an auto-detect button either on the device or a user input screen, or attachment of a probe. At 32, the user may optionally add the bus through a user interface. As mentioned above, this may result from a user pressing an auto-detect button or other user input, or the system making the determination that a bus has connected to the instrument. In the latter situation, the processor may not receive an explicit auto-detect signal, but a more implicit one that it generates itself. The signals may include clock, data, signal waveforms, etc.

The processor then executes instructions to apply machine learning to the signals to predict the type of bus connected to the instrument at 34.

The term "machine learning" as used here means a process of using statistical models to train a processor to make predictions. The bus identification resulting from this process comprises a prediction as to the bus type. These predictions typically have an accuracy weighting that provides a percentage estimate of the correctness of the prediction.

Generally, the machine learning used here will fall into one of two types: supervised machine learning; and unsupervised machine learning. Supervised machine learning as used here means machine learning based upon training sets that contain labeled data. Unsupervised learning 'learns' on training sets containing mostly unlabeled data to train the models. Further discussion will cover implementations using both of these approaches below.

Returning to FIG. 2, after the application of machine learning at 34, the instrument provides an identified bus type at 36, and may optionally provide the settings for the bus. As used here the term "identified" means the predicted bus type. Machine learning generally produces a prediction rather than an actual solution.

At 38, an optional process may occur, in which the instrument confirms the bus type upon disconnect or if the user changes the bus type after being presented with the predicted bus type. This may occur as part of the unsupervised learning process, which, because it operates more in real-time may allow for immediate adjustment of the training of the model at 39. However, it may also update the training data used for the supervised machine learning process.

Figure 3:
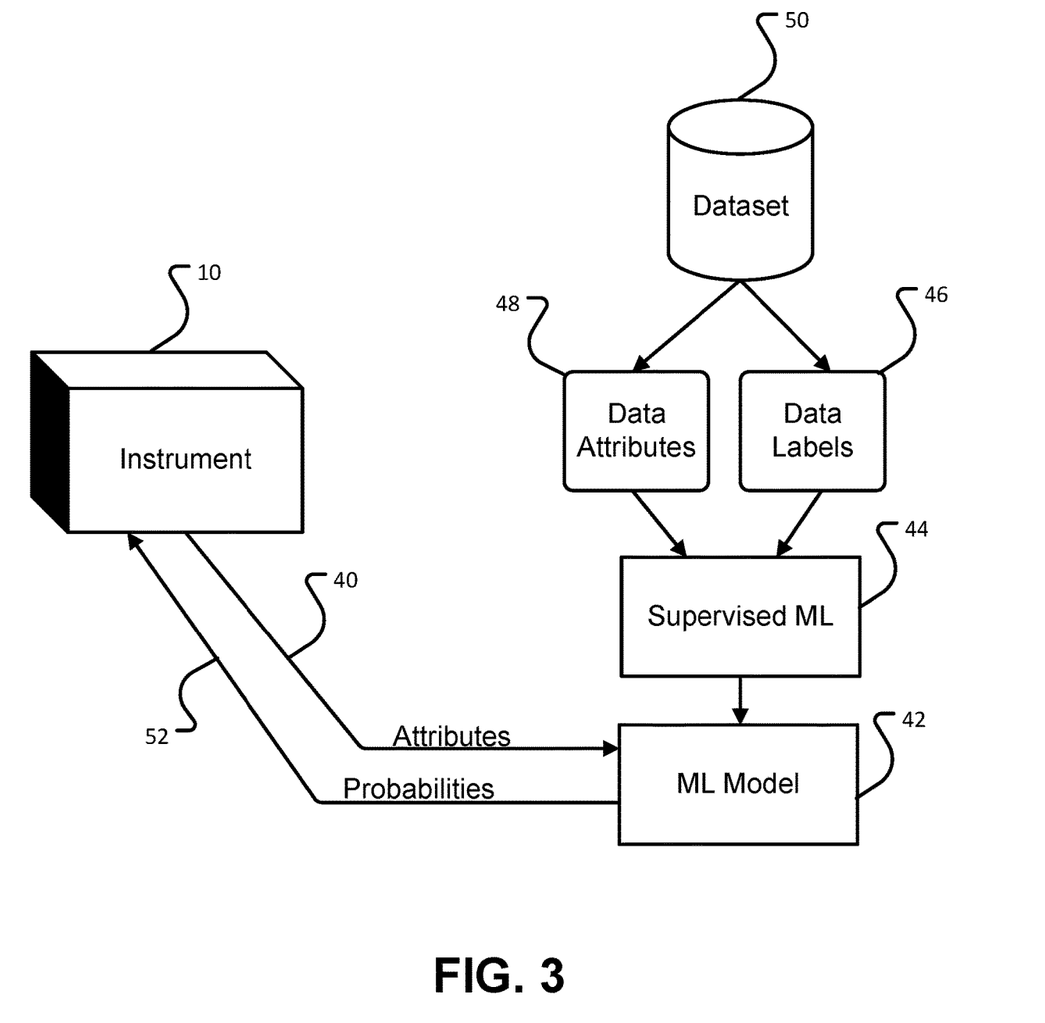
FIG. 3 shows a flowchart of an embodiment of a method to apply supervised machine learning detect a bus type automatically.
Figure 4:
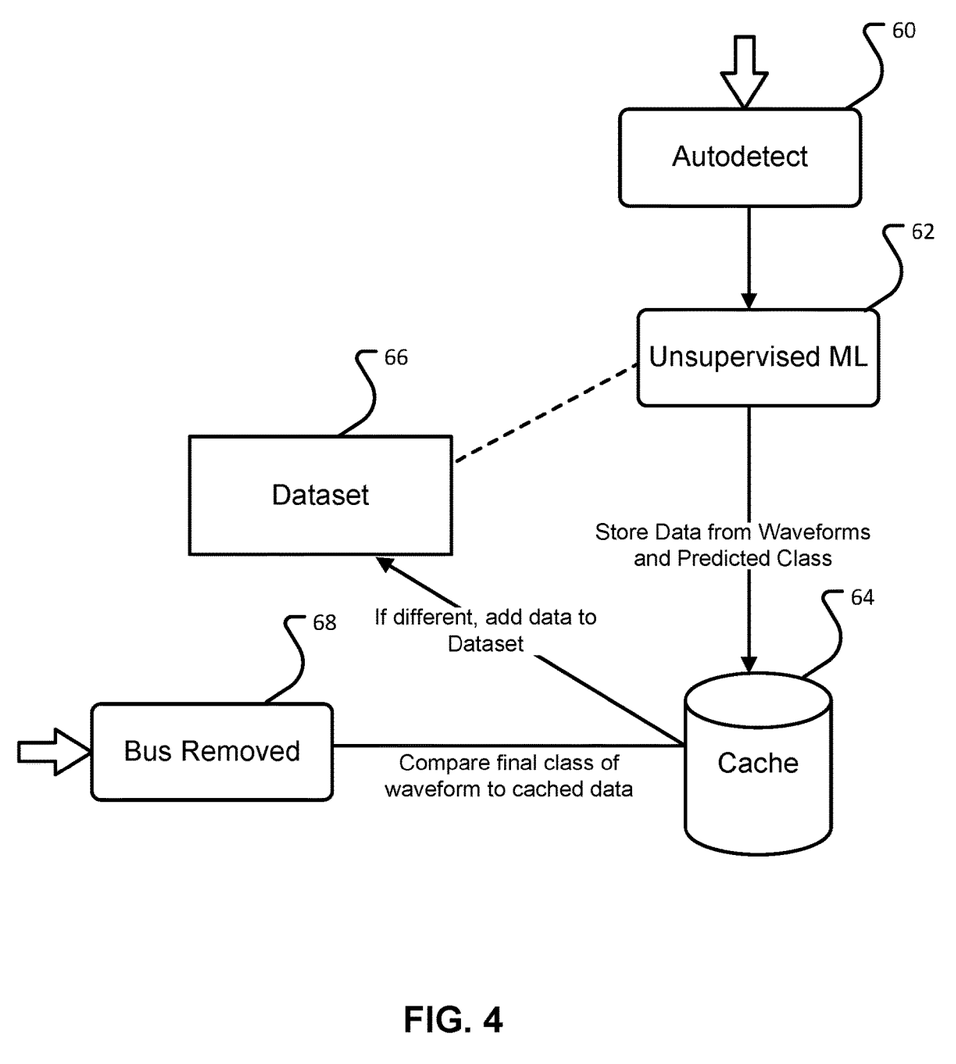
FIG. 4 shows a flowchart of an embodiment of a method to apply unsupervised machine learning to detect a bus type automatically.

FIGS. 3 and 4 address the two different machine learning processes to identify the bus type. FIG. 3 shows an embodiment that uses supervised machine learning 44. The machine learning model 42 employs a dataset 50 that identifies the data attributes 48 and corresponding data labels 46. A user typically spends the time to create this data, often in spreadsheet or comma-separated-value (CSV) format to provide it to the supervised learning model 42.

In operation, one can apply a process of dimensionality reduction to reduce the number of random variables on which the model runs. In one embodiment, some of the most influential attributes, meaning those that influence the prediction the most heavily, include bit amplitude, peak-to-peak, mean, and model, meaning the instrument 10 model. One embodiment identified twenty-five most-influential attributes. When the bus connects to the instrument 10 and the user either presses the auto-detect button, or the instrument determines on its own that a bus has connected to it, the instrument sends these attributes 40 to the model 42. The model then compares the waveform data/attributes to the saved data and determines which bus type the connected bus has the highest probability of being and returns the probabilities 52 to the instrument 10.

The machine learning process may apply a particular technique, such as a Bayesian approach, Random Forest, regression models and classification models. One example embodiment used Random Forest, as shown in the code excerpt below. This example used the Python library Scikit-learn and TensorFlow packages, and Scikit-learn's random forest classifier. The Scikit-learn library allows the data to be loaded from CSV files into NumPy arrays and then fed into the machine learning model. The model can then classify the data. The example below prints the results from the feature analysis, displaying the most influential features.

```
from _—future_— import absolute_import, division, print_function, unicode_literals
from sklearn import tree
from sklearn.ensemble import RandomForestClassifier
from sklearn.model_selection import train_test_split, cross_val_score
import numpy as np
import tensorflow as tf
from random import randint
csvli = [ ]
csvres = [ ]
pathtodata = "/home/rohan/assets"
X = np.genfromtxt(pathtodata+"/12cdata.csv", skip_header=1, delimiter=', ',
    usecols=range(0,8))
csvli.extend(X)
for i in range(0, len(X)):
        csvres.append(0)
X = np.genfromtxt(pathtodata+"/12cclk.csv", skip_header=1, delimiter=', ',
    usecols=range(0,8))
csvli.extend(X)
for i in range(0, len(X)):
        csvres.append(1)
X = np.genfromtxt(pathtodata+"/noise.csv", skip_header=1, delimiter=', ',
    usecols=range(0,8))
csvli.extend(X)
for i in range(0, len(X)):
        csvres.append(2)
clf = RandomForestClassifier(n_estimators=10, max_depth=None,
    random_state=np.random.radint(500))
xain, xest, yain, yest = train_test_split(csvli, csvres, test_size=0.33)
```

```
xain = np.array(xain)
clf1 = clf.fit(xain, yain)
print("Features: " + str(clf.feature_importances_))
print("Naive accuracy: " + str(clf1.score(xest, yest)))
scores = cross_val_score(clf, csvli, csvres, cv=12)
print("Cross-Val Accuracy: %f (+/- %f)" % (scores.mean( ), scores.std( ) * 2))
```

This provides merely one example and is not intended to limit the scope of the embodiments to any particular classifier or supervised machine learning approach.

FIG. 4 shows an unsupervised machine learning approach. At 60, when the bus connects to the instrument 10, the auto-detect process occurs, either explicitly with the button press or implicitly where the instrument detects the bus connection. The instrument then applies unsupervised machine learning at 62. In unsupervised machine learning, the dataset 66 may operate in more of a real-time mode. Initially, the unsupervised model 'trains' on a dataset that essentially allows it to operate independently to recognize patterns in the data and the associated result. The unsupervised machine learning model then stores the waveform and the predicted class, in this case the bus type, in the cache 64.

The user may manually switch the identification of the bus type from the predicted bus type, for example, if the predicted bus type was incorrect and did not match the actual bus type. Upon disconnect, at 68, the instrument may compare the final identification of the bus type associated with the waveforms from the bus to the cached data. If the two differ, this means the user manually switched the identified bus type. This may cause the processor to update the dataset 66 immediately, allowing the machine learning model to correct itself for future uses. The processor may also save the final bus type and the waveforms to overwrite the original bus type and waveforms in the memory other than the dataset.

In one experiment, applying the methods here, a user connected an $I^2C$ bus to the instrument. The machine predicted it as an $I^3C$ bus. After the user corrected it and disconnect, on the next pass the likelihood on the prediction, i.e. the probability, of the bus being an $I^2C$ bus went up, and the $I^3C$ bus went down.

Other extensions and modifications exist in various embodiments. For example, when a user tries to decode a long waveform, the machine learning model may slow down significantly, sometimes even by hours or days. In some embodiments, when the model detects a high record length waveform, it does not attempt to apply the machine learning. Improved machine learning models may be able analyze the high record length waveforms more quickly.

As mentioned above, the instrument can detect the connection of the bus on its own. In addition, the machine learning process may be able to detect changes in the live signals and detect the bus type when a signal is added or changes. The machine learning process can also extend to auto-detecting a majority of the parameters used by the predicted bus as well.

Some embodiments may include the use of user profiles. This allows the machine learning to have datasets based upon the user, such as the environment in which that user operates, configuring itself based on the user's data. This reduces any conflicts or 'confusion' on the machine learning process that can lower its accuracy. The user can log in, log out, save their data to a profile and pick up their work where they previously stopped.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example 1 is a test and measurement instrument comprising a processor configured to execute instructions that cause the processor to: receive a bus auto-detect signal; receive signals from a bus connected to the test and measurement instrument; and apply machine learning to the signals from the bus to output a predicted bus type; at least one memory to store the instructions and data used in the machine learning; and a display to display information for a user including the predicted bus type.

Example 2 is the test and measurement instrument of Example 1, wherein receiving the bus auto-detect signal comprises the processor determining that the bus has been connected to the test and measurement instrument and generating the bus auto-detect signal.

Example 3 is the test and measurement instrument of Example 1, further comprising a user interface including a bus auto-detect input, wherein receiving the bus auto-detect signal comprises one of receiving the bus auto-detect signal from the bus auto-detect input, or receiving the bus auto-detect signal in response to a user adding a bus through the user interface.

Example 4 is the test and measurement instrument of any of Examples 1 through 3, wherein applying machine learning to the signals from the bus comprises applying supervised machine learning.

Example 5 is the test and measurement instrument of any of Examples 1 through 4, wherein the processor is further configured to execute instructions that cause the processor to analyze the signals from the bus to determine attributes of the signals from the bus and apply the machine learning to the attributes to output the predicted bus type.

Example 6 the test and measurement instrument of any of Examples 1 through 3, wherein applying machine learning to the signals from the bus comprises applying unsupervised machine learning.

Example 7 is the test and measurement instrument of Example 6, wherein the processor is further configured to execute instructions that cause the processor to store waveforms from the bus and the predicted bus type in the at least one memory.

Example 8 is the test and measurement instrument as claimed in either of Examples 6 or 7, wherein the processor is further configured to execute instructions that cause the processor to compare a final bus type to the predicted bus type.

Example 9 is the test and measurement instrument of Example 8, wherein the processor is further configured to execute instructions further executes instructions to cause the processor to save the final bus type when the final bus type and the predicted bus type do not match.

Example 10 is the test and measurement instrument as claimed in Example 9, wherein the processor is further configured to execute instructions that cause the processor to save the final bus type and bus data under the final bus type in a dataset.

Example 11 is a method of automatically detecting a bus type, comprising receiving a bus auto-detect signal when a bus is connected to a test and measurement instrument; receiving signals from the bus at a processor; and using the processor to apply machine learning the signals from the bus to predict a bus identity.

Example 12 is the method of Example 11, wherein receiving the bus auto-detect signal comprises automatically determining, by the processor, that the bus has been connected to the test and measurement instrument, and generating, by the processor, the bus auto-detect signal.

Example 13 is the method of Example 11, wherein receiving the bus auto-detect signal comprises receiving a signal from a user input from one of either an auto-detect button or the user adding a bus through a user interface.

Example 14 is the method of any of Examples 11 through 13, wherein using the processor to apply machine learning further comprises using the processor to apply supervised machine learning.

Example 15 is the method of Example 14, further comprising analyzing the signals from the bus to determine attributes of the signals from the bus and wherein using the processor to apply machine learning to the signals from the bus comprises applying the machine learning to the attributes to predict the bus identity.

Example 16 is the method of Example 15, wherein using the processor to apply machine learning further comprises using the processor to apply unsupervised machine learning.

Example 17 is the method of Example 16, further comprising storing waveforms from the bus and the predicted bus type in at least one memory.

Example 18 is the method of Example 17, further comprising comparing a final bus identity to the predicted bus identity.

Example 19 is the method of Example 18, further comprising saving the final bus identity when the final bus identity and the predicted bus identity do not match.

Example 20 is the method of Example 19, wherein saving the final bus identity comprises saving the final bus identity and bus data under the final bus identity in a dataset.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:

1. A test and measurement instrument, comprising:
a port configured to receive signals from a probe couplable to an external bus of a device under test, wherein the external bus is separate from the test and measurement instrument;
a processor coupled to the port and configured to execute instructions that cause the processor to:
detect connection of the external bus to the test and measurement instrument via the probe, wherein a bus type of the external bus is unknown to the test and measurement instrument at a time of the connection to the test and measurement instrument;

receive signals from the external bus connected to the test and measurement instrument, wherein the signals comprise attributes corresponding to the bus type and unknown to the test and measurement instrument when received; and apply machine learning to the signals from the external bus to output a predicted bus type;

at least one memory to store the instructions and data used in the machine learning; and a display to display information for a user including the predicted bus type;

wherein the processor is further configured to execute instructions that cause the processor to store waveforms formed from the signals from the external bus and the predicted bus type in the at least one memory, and wherein applying machine learning to the signals involves comparing the signals and the attributes to the stored waveform in the at least one memory and determining the predicted bus type based on the comparison of the signals and attributes to the stored waveform.

2. The test and measurement instrument as claimed in claim 1, wherein detecting the connection of the external bus comprises the processor determining that the external bus has been connected to the test and measurement instrument and generating an indicator signal.

3. The test and measurement instrument as claimed in claim 2, further comprising a user interface including a bus auto-detect input, wherein the processor is further configured to execute instructions that cause the processor to: receive the indicator signal from the bus auto-detect input, or receive the indicator signal in response to a user adding the external bus through the user interface.

4. The test and measurement instrument as claimed in claim 1, wherein applying machine learning to the signals from the external bus comprises applying supervised machine learning.

5. The test and measurement instrument as claimed in claim 1, wherein the processor is further configured to execute instructions that cause the processor to analyze the signals from the external bus to determine attributes of the signals from the external bus and apply the machine learning to the attributes to output the predicted bus type.

6. The test and measurement instrument as claimed in claim 1, wherein applying machine learning to the signals from the external bus comprises applying unsupervised machine learning.

7. The test and measurement instrument as claimed in claim 6, wherein the processor is further configured to execute instructions that cause the processor to compare a final bus type to the predicted bus type.

8. The test and measurement instrument as claimed in claim 7, wherein the processor is further configured to execute instructions that cause the processor to save the final bus type when the final bus type and the predicted bus type do not match.

9. The test and measurement instrument as claimed in claim 8, wherein the processor is further configured to execute instructions that cause the processor to save the final bus type and bus data under the final bus type in a dataset.

10. The test and measurement instrument as claimed in claim 1, wherein applying the machine learning further comprises using probabilities of bus types to determine the predicted bus type.

11. A method of automatically detecting a bus type, comprising:

detecting connection of an external bus of a device under test to a port of a test and measurement instrument via a probe, wherein the port is configured to receive signals from the probe couplable to an external bus of a device under test, wherein the external bus is separate from the test and measurement instrument, wherein a bus type of the external bus is unknown to the test and measurement instrument at a time of the connection to the test and measurement instrument;

receiving signals from the external bus at a processor, wherein the signals comprise attributes corresponding to the bus type and wherein the attributes have values unknown to the test and measurement instrument when received;

using the processor to apply machine learning to the signals from the external bus to predict a bus identity; and storing waveforms formed from the signals from the external bus and the predicted bus type in at least one memory, and wherein using the processor to apply machine learning to the signals involves comparing the signals and the attributes to the stored waveform in the at least one memory and determining the predicted bus type based on the comparison of the signals and attributes to the stored waveform.

12. The method as claimed in claim 11, wherein detecting connection of the external bus comprises automatically determining, by the processor, that the external bus has been connected to the test and measurement instrument and generating, by the processor, an indicator signal.

13. The method as claimed in claim 11, further comprising receiving a signal from a user input from one of either an auto-detect button or a user adding the external bus through a user interface.

14. The method as claimed in claim 11, wherein using the processor to apply machine learning further comprises using the processor to apply supervised machine learning.

15. The method as claimed in claim 14, further comprising analyzing the signals from the external bus to determine the values of the attributes of the signals from the external bus and wherein using the processor to apply machine learning to the signals from the external bus comprises applying the machine learning to the attributes and the values of the attributes to predict the bus identity.

16. The method as claimed in claim 15, wherein using the processor to apply machine learning further comprises using the processor to apply unsupervised machine learning.

17. The method as claimed in claim 11, further comprising comparing a final bus identity to the predicted bus identity.

18. The method as claimed in claim 17, further comprising saving the final bus identity when the final bus identity and the predicted bus identity do not match.

19. The method as claimed in claim 18, wherein saving the final bus identity comprises saving the final bus identity and bus data under the final bus identity in a dataset.

20. The method as claimed in claim 11, wherein applying the machine learning further comprises using probabilities of bus types to determine the predicted bus type.

* * * * *